(12) United States Patent
Hallam

(10) Patent No.: US 11,086,944 B1
(45) Date of Patent: Aug. 10, 2021

(54) ONLINE SUBSCRIPTION SHARING SYSTEM

(71) Applicant: OnDemand Business Services, Inc., Chepachet, RI (US)

(72) Inventor: Christopher J. Hallam, Chepachet, RI (US)

(73) Assignee: OnDemand Business Services, Inc., Chepachet, RI (US)

( * ) Notice: Subject to any disclaimer, the term of this patent is extended or adjusted under 35 U.S.C. 154(b) by 376 days.

(21) Appl. No.: 15/946,002

(22) Filed: Apr. 5, 2018

Related U.S. Application Data

(60) Provisional application No. 62/489,086, filed on Apr. 24, 2017.

(51) Int. Cl.
*G06Q 30/06* (2012.01)
*G06F 16/951* (2019.01)
*H04L 29/08* (2006.01)
*H04L 29/06* (2006.01)

(52) U.S. Cl.
CPC ...... *G06F 16/951* (2019.01); *G06Q 30/0601* (2013.01); *H04L 63/08* (2013.01); *H04L 67/141* (2013.01)

(58) Field of Classification Search
CPC ...... G06F 16/951; H04L 63/08; H04L 67/141
See application file for complete search history.

(56) References Cited

U.S. PATENT DOCUMENTS

| | | | |
|---|---|---|---|
| 2014/0337513 A1* | 11/2014 | Amalapurapu | H04L 67/22 709/224 |
| 2015/0280983 A1* | 10/2015 | Staykoff | H04W 4/14 709/226 |
| 2017/0091843 A1 | 3/2017 | Zeigler et al. | |
| 2018/0191813 A1* | 7/2018 | Harpaz | H04L 67/1023 |

* cited by examiner

*Primary Examiner* — Robert W Beausoliel, Jr.
*Assistant Examiner* — Nirav K Khakhar
(74) *Attorney, Agent, or Firm* — Nutter McClennen & Fish LLP

(57) ABSTRACT

Embodiments of the present invention provide a web-based, short-term (e.g., as little as 1 hour) subscription service positioned between client devices and third-party digital subscription providers. The subscription service allows multiple online subscription services (e.g., newspapers, magazines, etc.) to be viewed or accessed on different client devices (e.g., tablets, desktop computers, laptop computers, smart phones, etc.) for a fee. The subscription service ensures that the client views the original content in the original format and retains associated metadata in the originally intended format for that particular publication on a particular client device and based on entitlements of the user of the client device.

20 Claims, 18 Drawing Sheets

Publication 1 (e.g., wsj.com)

| Subscription Access Code | Status | Associated User |
|---|---|---|
| Account 1 | In-use | User A |
| : | | |
| Account M | Available | |

Publication 2 (e.g., nytimes.com)

| Subscription Access Code | Subscription Access Code | Associated User |
|---|---|---|
| Account 1 | In-use | User B |
| : | | |
| Account N | In-use | User C |

Publication 1(e.g., wsj.com

| Subscription Access Code | Status | Associated User |
|---|---|---|
| Account 1 | In-use | User A |
| : | | |
| Account M | In-use | User X |

Publication 2 (e.g., nytimes.com)

| Subscription Access Code | Subscription Access Code | Associated User |
|---|---|---|
| Account 1 | In-use | User B |
| : | | |
| Account N | In-use | User C |

Publication 1 (e.g., wsj.com)

| Subscription Access Code | Status | Associated User |
|---|---|---|
| Account 1 | In-use | User A |
|  |  |  |
| Account M | In-use | User X |

Publication 2 (e.g., nytimes.com)

| Subscription Access Code | Subscription Access Code | Associated User |
|---|---|---|
| Account 1 | In-use | User B |
| : |  |  |
| Account N | In-use | User C |
| Account N+1 | In-use | User Y |

Publication delivered within a PTN frame

Publication delivered from PTN as a pass-through link

Login Page

Subscription Page

Fig. 11

Free Newstand Page

Subscriber Newstand Page

Contact Page

Newspaper (East) Links

Newspaper (West) Links

Digital Tablet Images

ONLINE SUBSCRIPTION SHARING SYSTEM

CROSS-REFERENCE TO RELATED APPLICATION(S)

This patent application claims the benefit of U.S. Provisional patent Application No. 62/489,086 entitled ONLINE SUBSCRIPTION SHARING SYSTEM filed on Apr. 24, 2017, which is hereby incorporated herein by reference in its entirety.

FIELD OF THE INVENTION

The present invention relates generally to online subscription sharing.

BACKGROUND OF THE INVENTION

There are digital (online) news consumers who are interested in accessing online news publications, but for whom the prevailing newspaper-offered subscription model is prohibitively expensive. While free limited access offers readers some exposure to available content, the time or content limited "paywalls" restrict satisfactory enjoyment to readers interested in wider content access. Generally speaking, a paywall is a publisher's demand for payment in order to access further content.

PressReader.com is a digital newspaper provider that offers scanned/digitized versions of publications (newspapers, magazines) from around the world. Single (daily) editions are offered, as well as monthly access to thousands of titles. This model focuses on digitized versions of the hard copy publications as opposed to the web-based publications and offers single page access until a purchase is required. At the time of this application, two key omissions to the portfolio of the PressReader site and apps are the New York Times and the Wall Street Journal.

Blendle.com is an online publisher news clipping service that offers customers access to specifically identified articles from a currently limited number of publications including newspapers such as the New York Times, the Wall Street Journal as well as business, social and current events magazines for a small one-time variable fee that is charged against a refillable "Wallet" that may be periodically replenished currently in increments of $10. Texture.com is a magazine subscription service that offers subscriber access to a wide range of popular magazines for a monthly fee. The Texture service is a joint venture formed by six leading publishers, namely Conde Nast, Hearst, Meredith, News Corp., Rogers Communications, and Time Inc. Thus, the Texture service is controlled by entities that control most if not all of the content provided by the Texture service.

SUMMARY OF EXEMPLARY EMBODIMENTS

In one exemplary embodiment, a method of providing access to online subscription services comprises receiving, by a server, a request from a client device of a user to access a specified online subscription service; associating, by the server, the user with a subscription access code maintained by the server for the specified online subscription service; establishing, by the server, a session between the server and the specified online subscription service using the subscription access code for the specified online subscription service; and providing, by the server, access to the specified online subscription service for the user via the session.

In another exemplary embodiment, a server for providing access to online subscription services is configured to receive a request from a client device of a user to access a specified online subscription service; associate the user with a subscription access code maintained by the server for the specified online subscription service; establish a session between the server and the specified online subscription service using the subscription access code for the specified online subscription service; and provide access to the specified online subscription service for the user via the session.

In various alternative embodiments, associating the user with the subscription access code may involve maintaining, by the server, a database containing at least one subscription access code for each of a plurality of online subscription services; determining, by the server, if there is at least one available subscription access code in the database for the online subscription service; and when there is an available subscription access code in the database for the online subscription service, selecting the subscription access code from among the at least one available subscription access code for the online subscription service.

Additionally or alternatively, associating the user with the subscription access code may involve when there is no available subscription access code in the database for the online subscription service, establishing a new subscription access code with the online subscription service; adding the new account to the database; and associating the user with the new subscription access code.

In various embodiments, establishing a session between the server and the specified online subscription service using the subscription access code for the specified online subscription service may involve logging into the specified online subscription service using the subscription access code. Additionally or alternatively, providing access to the specified online subscription service for the user via the session may involve retrieving a user-selected web page from the specified online subscription service using the session; and serving the retrieved user-selected web page to the client device of the user. In any of these exemplary embodiments, serving the retrieved user-selected web page may involve passing the retrieved user-selected web page through to the user, passing to the user a modified web page including information from the retrieved user-selected web page, or replacing an original link in the retrieved user-selected web page with a replacement link that directs a future request for the original link to the server so that the server can service the request. The request to access a specified online subscription service may include a link received from a social media application running on the client device, in which case the server may provide access to the link provided the user has a subscription with the server. In any of the above exemplary embodiments, a set of web pages allowing the user to access the server and specify the online subscription service may be served to the client device of the user.

In another exemplary embodiment, a method or server provides access to online subscription services by receiving, by a server, a request from a client device of a user to access a specified online subscription service; associating, by the server, the user with an account maintained by the server for the specified online subscription service; and redirecting, by the server, the request to the specified online subscription service along with metadata identifying the account.

In various alternative embodiments, the metadata may include a subscription access code maintained by the server for the specified online subscription service, an account identifier representing the account, and/or an amount of time the user is permitted to access the subscription service. The server may establish, prior to redirecting the request, a session between the server and the specified online subscription service using the account. The specified online subscription service may associate the user or the client device with the account based on the metadata.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which:

FIG. 2 is a schematic diagram of the subscription database management information used to manage subscriptions with the various publications for access by PTN users, in accordance with certain exemplary embodiments.

FIG. 4 is a schematic diagram of the subscription database management information of FIG. 2 updated to reflect that a new user (User X) is now associated with Account M of Publication 1, in accordance with certain exemplary embodiments.

FIG. 5 is a schematic diagram of the subscription database management information of FIG. 2 updated to reflect that a new user (User Y) is now associated with a new account Account N+1 of Publication 2, in accordance with certain exemplary embodiments.

FIG. 11 shows a sample subscription rate and purchase page for the PTN service, in accordance with one exemplary embodiment.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
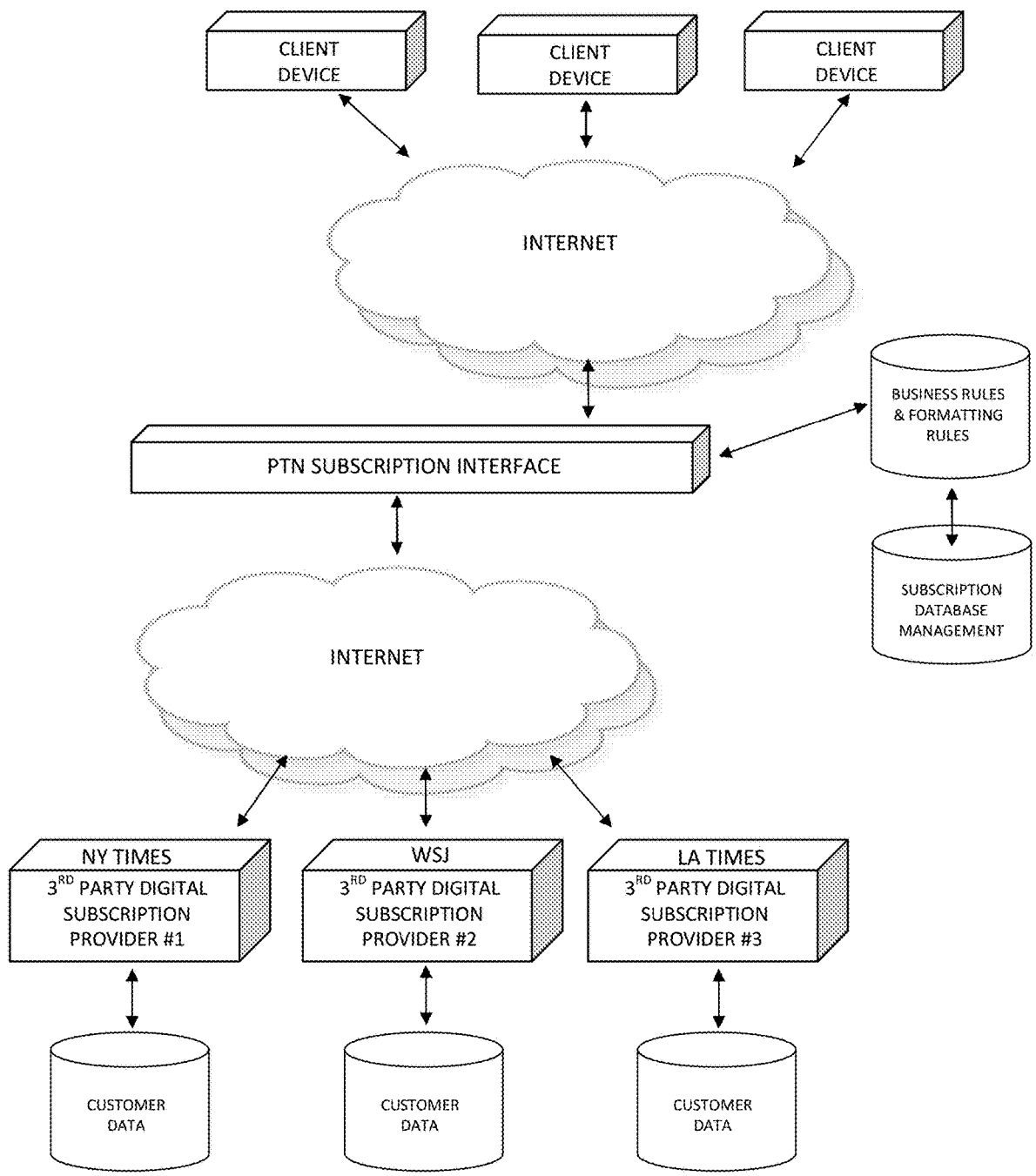
FIG. 1 is a schematic diagram of a PTN system, in accordance with one exemplary embodiment of the present invention.

Embodiments of the present invention provide a web-based, short-term (e.g., as little as 1 hour) subscription service positioned between client devices and third-party digital subscription providers. Exemplary embodiments are described herein with reference to an online publication subscription service (e.g., online newspapers) referred to as "Pass the News" or "PTN," although it should be noted that alternative embodiments can be applied to other types of subscription services. The subscription service allows multiple online publications (e.g., New York Times, Wall Street Journal, Washington Post, Los Angeles Times, etc.) to be viewed or accessed on different client devices (e.g., tablets, desktop computers, laptop computers, smart phones, etc.) for a fee. The subscription service ensures that the client views the original content in the original format and retains associated metadata in the originally intended format for that particular publication on a particular client device and based on entitlements of the user of the client device.

PTN provides a centralized virtual location on the internet for the collection and display of popular, geographically-diverse digital subscriptions (especially newspapers). PTN offers paid subscriber access to those publications on a time limited basis through a more affordable, shared-cost platform. Thus, PTN provides an economical option for consumers who would periodically like to have full subscriber access to major digital publications but for whom the cost of the subscription to one or more of these (and other) publications cannot be justified. While links to the limited, freely available news services will be aggregated and offered as a convenience, the financial model of this service is based on sharing the cost as well as the access of digital publications among a large base of consumers.

Among other things, PTN allows a plurality of users to access live newspaper websites without requiring the users to have active accounts with the newspaper websites. Specifically, a server system manages PTN purchased subscriptions with the newspaper websites and provides access by the users to those newspaper websites via those newspaper website subscriptions. When a user attempts to access a particular article at a particular newspaper website, the server system accesses the newspaper website using the subscription managed by the server system and transfers the available content to the user, typically (but not necessarily) framed, e.g., with a PTN frame, border, banner, or other indicia included on the pages served to the user.

While the initial focus of the invention is with regard to the delivery of news publishing content, it is expected and claimed that this subscription sharing methodology will be applicable to other subscription based services. These services may include but not be limited to book and music sales clubs, satellite radio, telephone companies, cell phone companies, internet TV and media providers, e-commerce retail clubs, financial services including online financial and business reporting, business journalism providers, software as a service (SaaS) providers, business solutions providers, research, academic and medical journals, political coverage and reporting businesses, private or chartered travel services (e.g., automobile, air and sea travel services), magazines, and other types of subscription services.

FIG. 1 is a schematic diagram of a PTN system, in accordance with one exemplary embodiment of the present invention. At the heart of the PTN system is a PTN subscription interface server that is in communication with various client devices and with various third party subscription providers over the Internet. The PTN subscription interface server includes, or is coupled with, one or more database systems such as for storage of business rules, formatting rules, and subscription management information. The PTN subscription interface server provides a web site interface through which PTN subscribers (also referred to herein as "users") access and use the PTN service.

In certain exemplary embodiments, the PTN subscription interface server establishes online subscriptions with each publication and then uses those online subscriptions to provide access to the online publications by PTN subscribers on a one-to-one basis, i.e., one PTN subscription to a particular publication will only be used for one PTN subscriber at a time, thereby avoiding issues when multiple users access a publication through a single online subscription such as by sharing the password among multiple users, which generally violates the terms of use of most online publications.

As users access the PTN web site interface and assess the available options presented, e.g., the New York Times, the Wall Street Journal, etc., they may choose to pay a fee to the PTN service for access to any or all available news sites with subscriptions owned by the PTN service. After payment, the database of available subscription access codes will be automatically referenced, and authorized subscriber credentials will be used to log on to the user-selected publication. This interaction may happen directly between the PTN site and the target publication provider on behalf of the user and not apparent to the user, or may happen through a modification of the target publication link to include log in credentials appended to that link. Optionally, the user's access time may be limited by means of a timer programmed into the PTN subscription code and/or may redundantly be terminated by prearranged or established rules of the publication sites.

As an example, User A, who is interested in accessing the Wall Street Journal digital news site, may visit the PTN site and select the page showing currently available subscriptions. After determining that the Wall Street Journal is presently available, User A may select the PTN subscription page and pay the fee by credit card or other accepted payment such as Apple Pay, Google Wallet, Android Pay, PayPal, etc., which will allow access to the Wall Street Journal as well as any other presently subscribed to and available news site. After payment is made, and the Wall Street Journal is selected by User A from the list of available news sites, the PTN site will automatically reference the database of subscription login credentials, assign a set of available credentials to User A, and initiate the login process directly with the Wall Street Journal site in order to establish a session between the PTN subscription interface server and the Wall Street Journal site. After logging into the site, the PTN subscription interface server preferably begins a countdown timer determined by the amount of subscription time requested and paid for by the user. The publication site may also start a countdown timer based on its own group subscriber rules. During the PTN logon time, User A may access the Wall Street Journal for the entire period, or, after returning to the PTN site, may switch to another available news site. If that user does choose to access another news site, the PTN subscription interface server will again reference the PTN database of available subscription log on credentials and, upon assigning credentials for this transaction, will initiate the log in for that site in order to establish a session between the PTN subscription interface server and the publication site. After the total amount of time spent on both (or all) news sites reaches the limit set by the amount of time purchased, access to PTN owned subscriptions will be terminated. The user may continue browsing the freely available PTN news sites through links to those sites without fee, or pay to access subscription based services again.

Subscription database management will incorporate predefined algorithms to continually update the list of available subscriptions as user access is granted and terminated, display access availability in real time, and update the number of subscriptions required to meet customer demand.

The above activity generally describes personal computer or mobile device access through a web browser interface. The present application also provides for application based access using the same procedures only through the use of a downloadable mobile application that will be available for mobile phone and tablet access.

Certain embodiments will provide for automatic access and routing of access credentials through the use of common social media applications such as Baidu Tieba, Facebook (and its associated Facebook Messenger), Gab, Google+, Instagram, LinkedIn, Pinterest, Reddit, Snapchat, Tumblr, Twitter, Viber, WeChat, Weibo, WhatsApp, and YouTube. This would typically, but not necessarily, involve a monthly or annual subscription agreement with PTN. As a subscriber, when a fellow social media contact broadcasts, sends, or resends digital newspaper links, access to those links with subscriptions owned by PTN and available at the time of the access request will be automatically granted, allowing for content access without the user personally owning subscription rights.

FIG. 2 is a schematic diagram of the subscription database management information used to manage subscriptions with the various publications for access by PTN users, in accordance with certain exemplary embodiments. Generally speaking, for each publication, the PTN subscription interface server manages a number of subscription access codes, where a subscription access code includes information needed for the PTN subscription interface server to log into the publication site (e.g., an account username and password). The subscription database management information also includes, for each subscription access code, the status of that subscription access code (e.g., in-use or available) and if in-use, the user associated with that subscription access code. In the example shown in FIG. 2, the PTN subscription interface server has M accounts set up for Publication 1 and N accounts set up for Publication 2.

Figure 3:
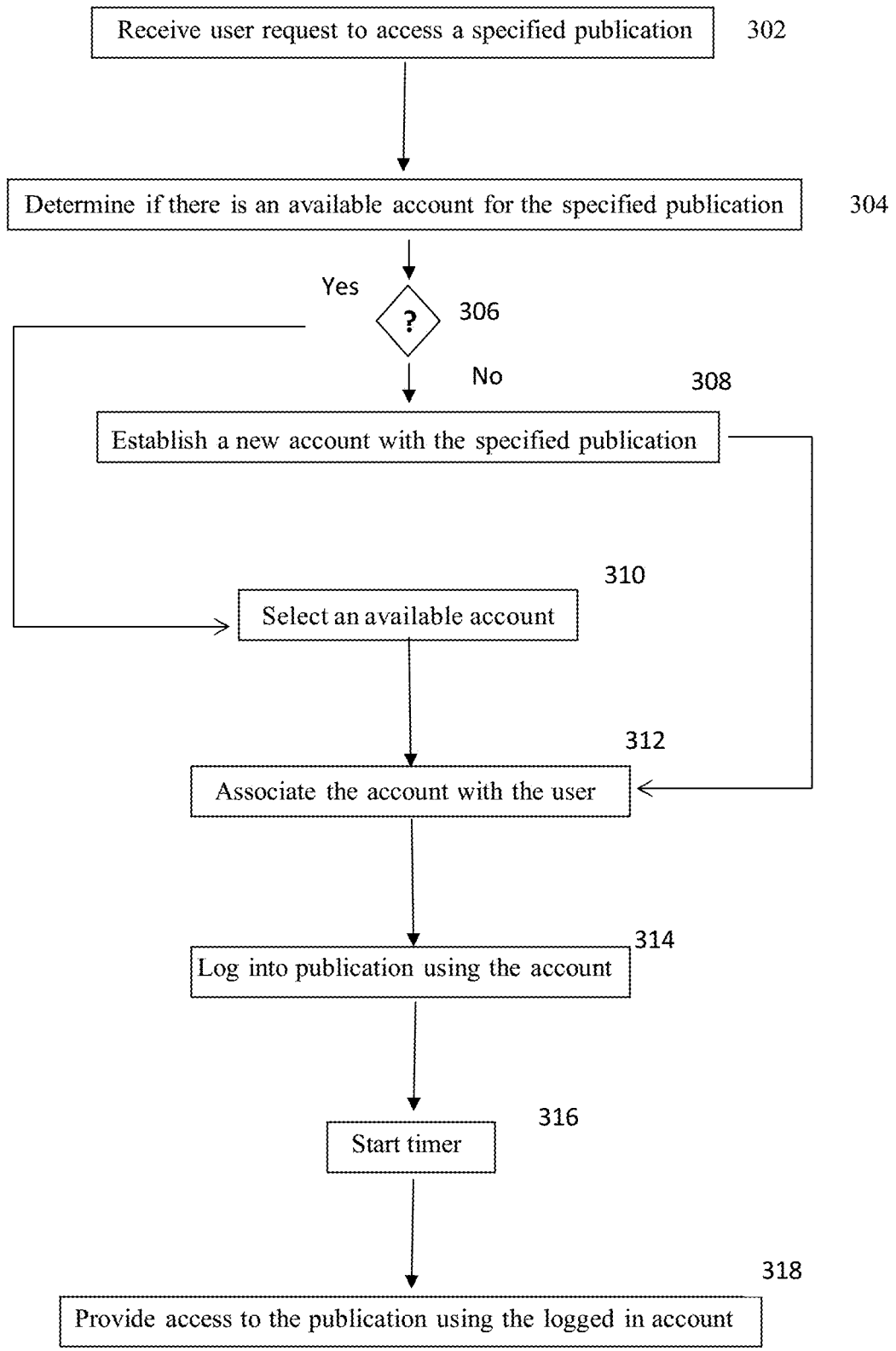
FIG. 3 is a logic flow diagram for operation of the PTN subscription interface server, in accordance with certain exemplary embodiments.

FIG. 3 is a logic flow diagram for operation of the PTN subscription interface server, in accordance with certain exemplary embodiments. In block 302, the PTN subscription interface server receives a user request to access a particular publication. In block 304, the PTN subscription interface server determines if there is an available account for the specified publication. If there is an available account for the specified publication (YES in block 306), then the PTN subscription interface server proceeds to select an available account, in block 310, and associate the account with the user, in block 312. If, however, there is no available account for the specified publication (NO in block 307), then in some exemplary embodiments, the PTN subscription interface server may establish a new account with the specified publication, in block 308, and associated the account with the user, in block 312 (in certain alternative embodiments, the PTN subscription interface server instead may block the user from accessing the specified publication until an account is available, or in other alternative embodiments, the PTN subscription interface server may prevent the user from requesting access to a publication unless there is an available account). From block 312, the PTN subscription interface server logs into the publication using the account, in block 314, starts a timer, in block 316, and provides access to the publication using the logged in account, in block 318.

FIG. 4 is a schematic diagram of the subscription database management information of FIG. 2 updated to reflect that a new user (User X) is now associated with Account M of Publication 1, in accordance with certain exemplary embodiments. This association may have occurred, for example, when User X requested access to Publication 1 and the PTN subscription interface server identified Account M as being available.

FIG. 5 is a schematic diagram of the subscription database management information of FIG. 2 updated to reflect that a new user (User Y) is now associated with a new account Account N+1 of Publication 2, in accordance with certain exemplary embodiments. This association may have occurred, for example, when User Y requested access to Publication 2, the PTN subscription interface server determined that no accounts were available for Publication 2, so the PTN subscription interface server established a new account with Publication 2 and updated the subscription database management information to include the new account as well as the association with User Y.

In certain exemplary embodiments, when a user requests access to a particular article of a publication (e.g., based on a link to the article on the publication web site), the PTN subscription interface server retrieves the article and serves it to the user in the form of web pages. Such serving may involve a pass-through function, where web pages from the online publication site are passed through to the user, or may involve some processing by the PTN subscription interface server, such as adding any of various types of information to the web pages served to the user, for example, framing, additional advertisements, etc. In some cases, the PTN subscription interface server may replace one or more original links in the retrieved web pages with a replacement link that directs a future request of the original link to the PTN subscription interface server so that the PTN subscription interface server can service the request as discussed herein.

Figure 6:
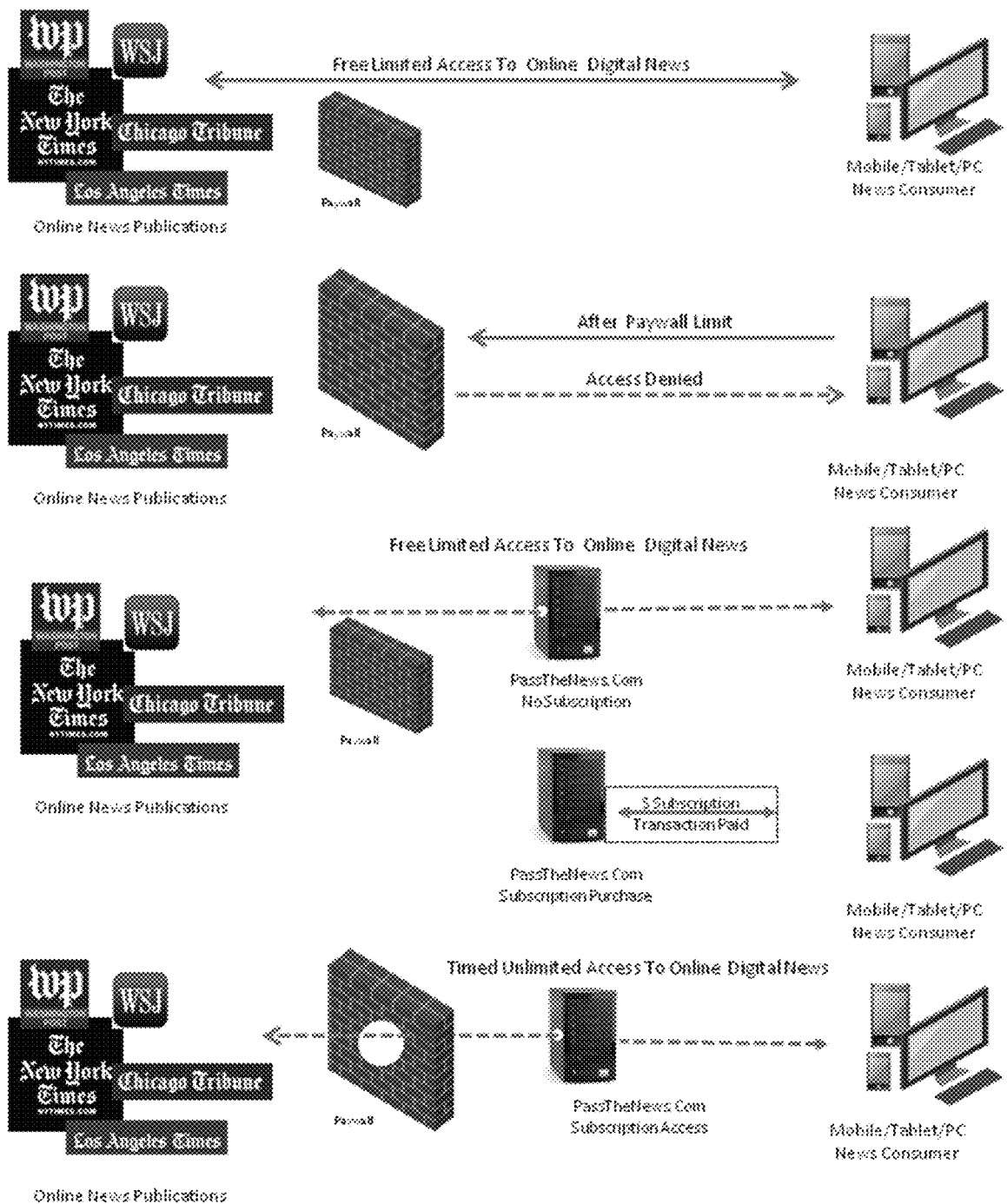
FIG. 6 illustrates free limited access to an online publication, the denial of continued free access upon reaching the paywall limit, and the PTN service solution that bypasses the paywall in order to provide continued access for the user.

FIG. 6 illustrates free limited access to an online publication, the denial of continued free access upon reaching the paywall limit, and the PTN service solution that bypasses the paywall in order to provide continued access for the user.

Figure 7:
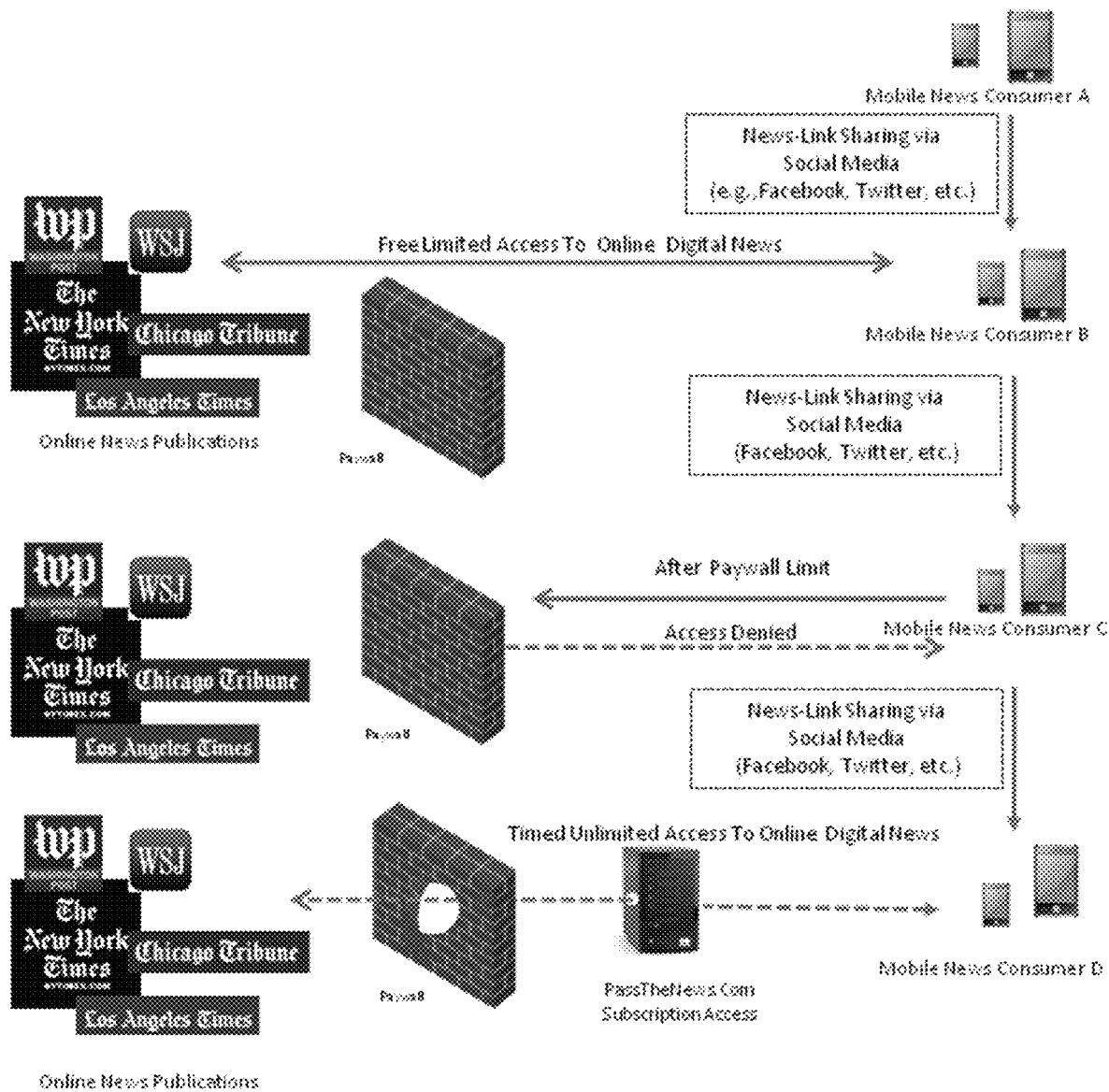
FIG. 7 illustrates social media news sharing scenarios with and without the PTN service.

FIG. 7 illustrates social media news sharing scenarios with and without the PTN service.

Figure 8:
FIG. 8 shows a sample publication delivered within a frame via a PTN web page, in accordance with one exemplary embodiment.

FIG. 8 shows a sample publication delivered within a frame via a PTN web page, in accordance with one exemplary embodiment.

Figure 9:
FIG. 9 shows a sample publication delivered via a pass-through link from a PTN web page and not within a frame, in accordance with one exemplary embodiment.

FIG. 9 shows a sample publication delivered via a pass-through link from a PTN web page and not within a frame, in accordance with one exemplary embodiment.

Figure 10:
FIG. 10 shows a sample login page for the PTN service, in accordance with one exemplary embodiment.

FIG. 10 shows a sample login page for the PTN service, in accordance with one exemplary embodiment.

Figure 11:
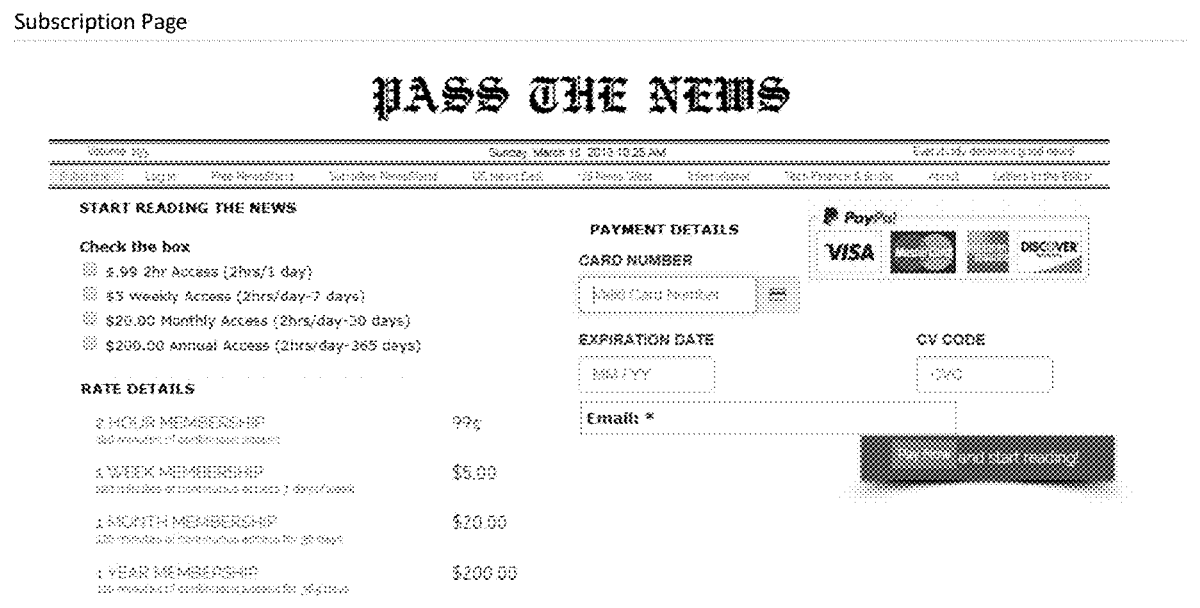

FIG. 11 shows a sample subscription page for the PTN service, in accordance with one exemplary embodiment.

Figure 12:
FIG. 12 shows a digital newsstand page showing publication images with links to freely available publications that may be delivered within the PTN service, in accordance with one exemplary embodiment.

FIG. 12 shows a dynamically updated availability page showing publication usage of the PTN service, in accordance with one exemplary embodiment.

Figure 13:
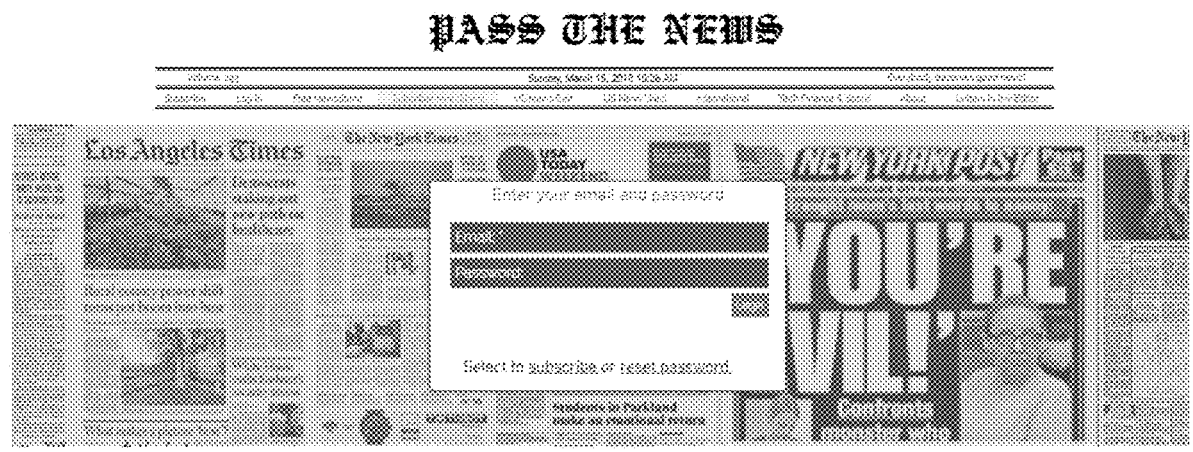
FIG. 13 shows a digital newsstand page showing publication images access to which require purchase of authorized login credentials to access available publications that may be delivered within and owned by the PTN service, in accordance with one exemplary embodiment.

FIG. 13 shows a membership selection page specifying the various membership types and costs available from the PTN service, in accordance with one exemplary embodiment.

Figure 14:
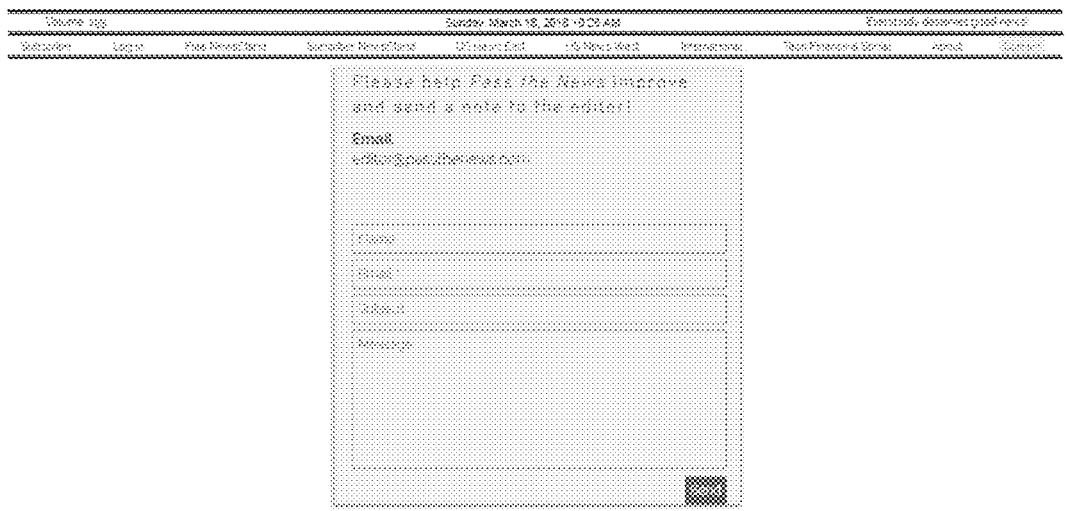
FIG. 14 shows a contact page through which a user may provide feedback to the PTN service, in accordance with one exemplary embodiment.

FIG. 14 shows a contact page through which a user may provide feedback to the PTN service, in accordance with one exemplary embodiment.

Figure 15:
FIG. 15 shows a first publication selection page listing various publications that are available through the PTN service, in accordance with one exemplary embodiment.

FIG. 15 shows a first publication selection page listing various publications that are available through the PTN service, in accordance with one exemplary embodiment.

Figure 16:
FIG. 16 shows a second publication selection page listing various publications that are available through the PTN service, in accordance with one exemplary embodiment.

FIG. 16 shows a second publication selection page listing various publications that are available through the PTN service, in accordance with one exemplary embodiment.

Figure 17:
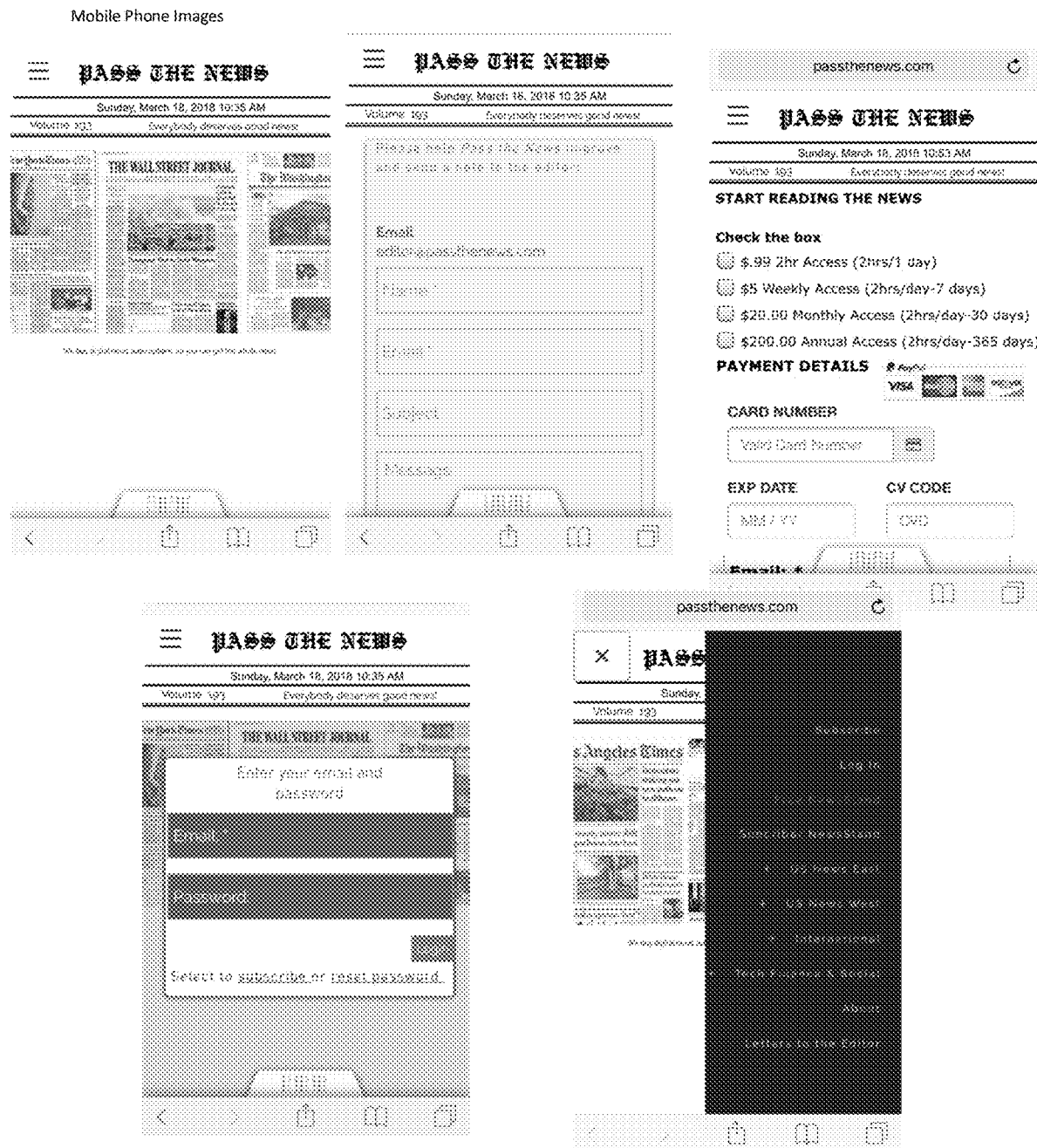
FIG. 17 shows various mobile phone screenshot examples of pages that are available through the PTN service, in accordance with one exemplary embodiment.

FIG. 17 shows various mobile phone screenshot examples of pages that are available through the PTN service, in accordance with one exemplary embodiment.

Figure 18:
FIG. 18 shows various digital tablet screenshot examples of pages that are available through the PTN service, in accordance with one exemplary embodiment.

FIG. 18 shows various digital tablet screenshot examples of pages that are available through the PTN service, in accordance with one exemplary embodiment.

In other exemplary embodiments, when a user requests access to a particular publication (e.g., based on a link on PTN web page provided by the PTN subscription interface server), the PTN subscription interface server redirects the user request to the online publication site along with metadata identifying the account to be used for the transaction (e.g., the subscription access code for the account associated with the user, such as in block 312 above, or an account identifier representing such account) and optionally including other information, e.g., the amount of time the user is permitted to access the publication. In this way, the publication web site, through an agreement with the PTN service, can control user accesses based on the PTN-owned account as identified in the metadata. In certain embodiments, the PTN subscription interface server may log into the publication web site using the account information prior to redirecting the user request, while in other embodiments the publication web site can use the metadata to log-in the user at the time it receives the redirected user request. Once the publication web site has associated the user with the PTN-owned account, future user requests can go directly to the publication web site (e.g., though direct links in the publication's web pages) without going through the PTN subscription interface server. The publication web site can enforce PTN subscription requirements, such as the amount of time the user can access the publication web site.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that terms such as "client" and "server" (e.g., in the context of client device and the PTN subscription interface server) may be used herein to describe devices that may be used in certain embodiments of the present invention and should not be construed to limit the present invention to any particular device type unless the context otherwise requires. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the PTN subscription interface server described herein) are necessarily non-conventional because, absent special programming or configuration, the conventional components do not inherently perform the described non-conventional methods.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P21. A method of providing access to online publications, the method comprising:

receiving, by a server, a request from a client device of a user to access a specified online publication;

associating, by the server, the user with an account maintained by the server for the specified online publication; and redirecting, by the server, the request to the specified online publication along with metadata identifying the account.

P22. A method according to claim P21, wherein the metadata includes a subscription access code maintained by the server for the specified online publication.

P23. A method according to claim P21, wherein the metadata includes an account identifier representing the account.

P24. A method according to claim P21, wherein the metadata includes an amount of time the user is permitted to access the publication.

P25. A method according to claim P21, further comprising:

establishing, by the server, prior to redirecting the request, a session between the server and the specified online publication using the account.

P26. A method according to claim P21, further comprising:

associating, by the specified online publication, the user or the client device with the account based on the metadata.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A method of providing access to online subscription services, the method comprising:

receiving, by a server, a request from a client device of a user to access a specified online subscription service to which the server has subscribed and for which the server has received and maintains at least one subscription access code;

associating, by the server, the user with an available subscription access code maintained by the server for the specified online subscription service;

establishing, by the server, a session between the server and the specified online subscription service using the associated subscription access code for the specified online subscription service; and providing, by the server, access to the specified online subscription service for the user via the session, wherein the user is provided access to the specified online subscription service without requiring the user to have its own active subscription with the specified online subscription service and wherein the at least one subscription access code maintained by the server can be shared among a plurality of users.

2. A method according to claim 1, wherein associating the user with the subscription access code comprises:

maintaining, by the server, a database containing at least one subscription access code for each of a plurality of online subscription services;

determining, by the server, if there is at least one available subscription access code in the database for the online subscription service; and when there is an available subscription access code in the database for the online subscription service, selecting the subscription access code from among the at least one available subscription access code for the online subscription service.

3. A method according to claim 2, wherein associating the user with the subscription access code further comprises:

when there is no available subscription access code in the database for the online subscription service, establishing a new subscription access code with the online subscription service;

adding the new account to the database; and associating the user with the new subscription access code.

4. A method according to claim 1, wherein establishing a session between the server and the specified online subscription service using the subscription access code for the specified online subscription service comprises:

logging into the specified online subscription service using the subscription access code.

5. A method according to claim 1, wherein providing access to the specified online subscription service for the user via the session comprises:

retrieving a user-selected web page from the specified online subscription service using the session; and serving the retrieved user-selected web page to the client device of the user.

6. A method according to claim 5, wherein serving the retrieved user-selected web page comprises:

passing the retrieved user-selected web page through to the user.

7. A method according to claim 5, wherein serving the retrieved user-selected web page comprises:

passing to the user a modified web page including information from the retrieved user-selected web page.

8. A method according to claim 5, wherein serving the retrieved user-selected web page comprises:

replacing an original link in the retrieved user-selected web page with a replacement link that directs a future request for the original link to the server so that the server can service the request.

9. A method according to claim 5, wherein the request to access a specified online subscription service includes a link received from a social media application running on the client device, and wherein the server provides access to the link provided the user has a subscription with the server.

10. A method according to claim 1, further comprising:

serving, to the client device of the user, a set of web pages allowing the user to access the server and specify the online subscription service.

11. A server for providing access to online subscription services, the server configured to receive a request from a client device of a user to access a specified online subscription service to which the server has subscribed and for which the server has received and maintains at least one subscription access code; associate the user with an available subscription access code maintained by the server for the specified online subscription service; establish a session between the server and the specified online subscription service using the associated subscription access code for the specified online subscription service; and provide access to the specified online subscription service for the user via the session, wherein the user is provided access to the specified online subscription service without requiring the user to have its own active subscription with the specified online subscription service and wherein the at least one subscription access code maintained by the server can be shared among a plurality of users.

12. A server according to claim 11, wherein associating the user with the subscription access code comprises:

maintaining, by the server, a database containing at least one subscription access code for each of a plurality of online subscription services;

determining, by the server, if there is at least one available subscription access code in the database for the online subscription service; and when there is an available subscription access code in the database for the online subscription service, selecting the subscription access code from among the at least one available subscription access code for the online subscription service.

13. A server according to claim 12, wherein associating the user with the subscription access code further comprises:

when there is no available subscription access code in the database for the online subscription service, establishing a new subscription access code with the online subscription service;

adding the new account to the database; and associating the user with the new subscription access code.

14. A server according to claim 11, wherein establishing a session between the server and the specified online subscription service using the subscription access code for the specified online subscription service comprises:

logging into the specified online subscription service using the subscription access code.

15. A server according to claim 11, wherein providing access to the specified online subscription service for the user via the session comprises:

retrieving a user-selected web page from the specified online subscription service using the session; and serving the retrieved user-selected web page to the client device of the user.

16. A server according to claim 15, wherein serving the retrieved user-selected web page comprises:

passing the retrieved user-selected web page through to the user.

17. A server according to claim 15, wherein serving the retrieved user-selected web page comprises:

passing to the user a modified web page including information from the retrieved user-selected web page.

18. A server according to claim 15, wherein serving the retrieved user-selected web page comprises:

replacing an original link in the retrieved user-selected web page with a replacement link that directs a future request for the original link to the server so that the server can service the request.

19. A server according to claim 15, wherein the request to access a specified online subscription service includes a link received from a social media application running on the client device, and wherein the server provides access to the link provided the user has a subscription with the server.

20. A server according to claim 11, further comprising:

serving, to the client device of the user, a set of web pages allowing the user to access the server and specify the online subscription service.

* * * * *